(12) United States Patent
Lee et al.

(10) Patent No.: US 11,337,239 B2
(45) Date of Patent: May 17, 2022

(54) METHOD AND APPARATUS FOR SELECTING CARRIER

(71) Applicant: LG Electronics Inc., Seoul (KR)

(72) Inventors: Youngdae Lee, Seoul (KR); Jaewook Lee, Seoul (KR); Jongwoo Hong, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 16/617,416

(22) PCT Filed: Jul. 24, 2018

(86) PCT No.: PCT/KR2018/008354
§ 371 (c)(1),
(2) Date: Nov. 26, 2019

(87) PCT Pub. No.: WO2019/022471
PCT Pub. Date: Jan. 31, 2019

(65) Prior Publication Data
US 2020/0146040 A1 May 7, 2020

Related U.S. Application Data

(60) Provisional application No. 62/536,983, filed on Jul. 25, 2017.

(51) Int. Cl.
*H04W 72/12* (2009.01)
*H04W 72/04* (2009.01)
(Continued)

(52) U.S. Cl.
CPC ... *H04W 72/1284* (2013.01); *H04W 72/0413* (2013.01); *H04W 72/10* (2013.01);
(Continued)

(58) Field of Classification Search
CPC combination set(s) only.
See application file for complete search history.

(56) References Cited

U.S. PATENT DOCUMENTS

2011/0170495 A1* 7/2011 Earnshaw ............... H04L 5/001
370/329
2012/0099452 A1 4/2012 Dai et al.
(Continued)

FOREIGN PATENT DOCUMENTS

EP 3419363 12/2018
KR 20170053573 5/2017
(Continued)

OTHER PUBLICATIONS

Samsung Electronics R&D Institute UK, "Considerations on multiple SPS configurations in NR," R2-1707011, 3GPP TSG-RAN WG2 NR ad-hoc #2, Qingdao, China, Jun. 27-29, 2017, 6 pages.
(Continued)

*Primary Examiner* — Vinncelas Louis
(74) *Attorney, Agent, or Firm* — Fish & Richardson P.C.

(57) ABSTRACT

Provided are a method for a user equipment (UE) to transmit a medium access control protocol data unit (MAC PDU) in a wireless communication system, and an apparatus supporting the same. The method may include: receiving information on priorities of semi persistent scheduling (SPS) configurations, from a base station; selecting a first carrier among the multiple carriers, based on the information on priorities of the SPS configurations; allocating a resource of the selected first carrier to a logical channel with the highest priority; and transmitting the MAC PDU, by using the resource of the selected first carrier.

11 Claims, 11 Drawing Sheets

(51) Int. Cl.
    *H04W 72/10* (2009.01)
    *H04W 72/14* (2009.01)

(52) U.S. Cl.
    CPC ... *H04W 72/1242* (2013.01); *H04W 72/1268* (2013.01); *H04W 72/14* (2013.01); *H04W 72/0453* (2013.01)

(56) References Cited

U.S. PATENT DOCUMENTS

2014/0233480 A1    8/2014  Kim et al.
2016/0212629 A1*   7/2016  Wei .................. H04W 36/0085

FOREIGN PATENT DOCUMENTS

WO    WO2011137444    11/2011
WO    WO2013169173    11/2013

OTHER PUBLICATIONS

3rd Generation Partnership Project; Technical Specification Group Radio Access Network, "Evolved Universal Terrestrial Radio Access (E-UTRA); Medium Access Control (MAC) protocol specification (Release 14)," 3GPP TS 36.321, V14.3.0, dated Jun. 2017, 107 pages.

EP Office Action in European Appln. No. 18 837 653.7, dated Mar. 5, 2021, 10 pages.

Extended European Search Report in European Appln. No. 18837653.7, dated May 27, 2020, 12 pages.

Intel Corporation, Random resource selection by pedestrian UEs for V2V, R1-1609456, 3GPP TSG RAN WG1 Meeting #86bis, Lisbon, Portugal, Oct. 10-14, 2016, 3 pages.

Office Action in European Appln No. 18837653.7, dated Sep. 16, 2021, 10 pages.

* cited by examiner

METHOD AND APPARATUS FOR SELECTING CARRIER

CROSS-REFERENCE TO RELATED APPLICATIONS

This application is a National Stage application under 35 U.S.C. § 371 of International Application No. PCT/KR2018/008354, filed on Jul. 24, 2018, which claims the benefit of U.S. Provisional Application No. 62/536,983, filed on Jul. 25, 2017. The disclosures of the prior applications are incorporated by reference in their entirety.

BACKGROUND OF THE DISCLOSURE

Field of the Disclosure

The present invention relates to a wireless communication system, and more particularly, to a method for a user equipment (UE) to select at least one carrier among multiple carriers based on priorities and an apparatus supporting the same.

Related Art

In order to meet the demand for wireless data traffic, which has been increasing since the commercialization of a fourth-generation (4G) communication system, efforts are being made to develop an improved fifth-generation (5G) communication system or pre-5G communication system. For this reason, a 5G communication system or pre-5G communication system is referred to as a beyond-4G-network communication system or post-long-term evolution (LTE) system.

SUMMARY OF THE DISCLOSURE

Meanwhile, according to the prior art, a resource pool is configured only on a single carrier. Thus, an RRC layer of the UE (i.e. UE RRC) selects a resource pool on a single carrier, and then a MAC layer of the UE (i.e. UE MAC) performs resource (re-)selection on the selected resource pool. On the other hand, in case that resource pools are configured on multiple carriers, the UE may perform parallel transmissions on different carriers. If the UE performs parallel transmissions on different carriers, the UE will independently select resources on each pool/carrier. In this case, the UE may perform parallel transmissions on congested carriers, and so increase congestion on those carriers. Thus, a method for a UE to select at least one carrier among multiple carriers and an apparatus supporting the same need to be proposed.

One embodiment provides a method for transmitting, by a user equipment (UE), a medium access control protocol data unit (MAC PDU) in a wireless communication system. The method may include: receiving information on priorities of semi persistent scheduling (SPS) configurations, from a base station; selecting a first carrier among multiple carriers, based on the information on priorities of the SPS configurations; allocating a resource of the selected first carrier to a logical channel with the highest priority; and transmitting the MAC PDU, by using the resource of the selected first carrier.

Another embodiment provides a method for transmitting, by a user equipment (UE), a medium access control protocol data unit (MAC PDU) in a wireless communication system. The method may include: receiving information on priorities of multiple carriers, from a base station; selecting a first carrier among the multiple carriers, based on the information on priorities of the multiple carriers; allocating a resource of the selected first carrier to a logical channel with the highest priority; and transmitting the MAC PDU, by using the resource of the selected first carrier.

Another embodiment provides a user equipment (UE) transmitting a medium access control protocol data unit (MAC PDU) in a wireless communication. The UE may include: a memory; a transceiver; and a processor, connected to the memory and the transceiver, that: controls the transceiver to receive information on priorities of semi persistent scheduling (SPS) configurations, from a base station; selects a first carrier among multiple carriers, based on the information on priorities of the SPS configurations; allocates a resource of the selected first carrier to a logical channel with the highest priority; and controls the transceiver to transmit the MAC PDU, by using the resource of the selected first carrier.

The UE can select at least one carrier among configured multiple carrier.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE. 5G communication system is an evolution of the LTE-A.

For clarity, the following description will focus on LTE-A. However, technical features of the present invention are not limited thereto.

Figure 1:
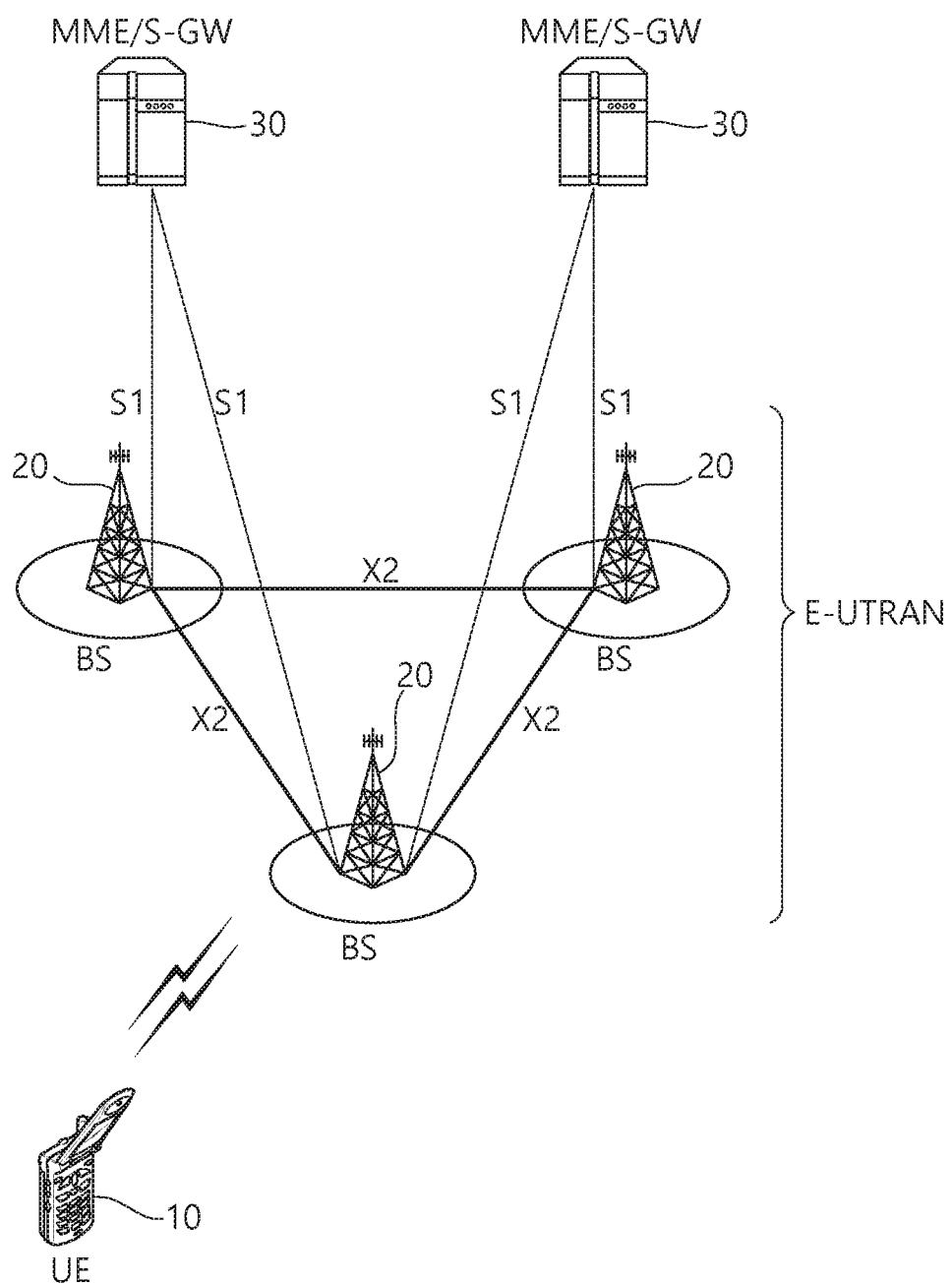
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
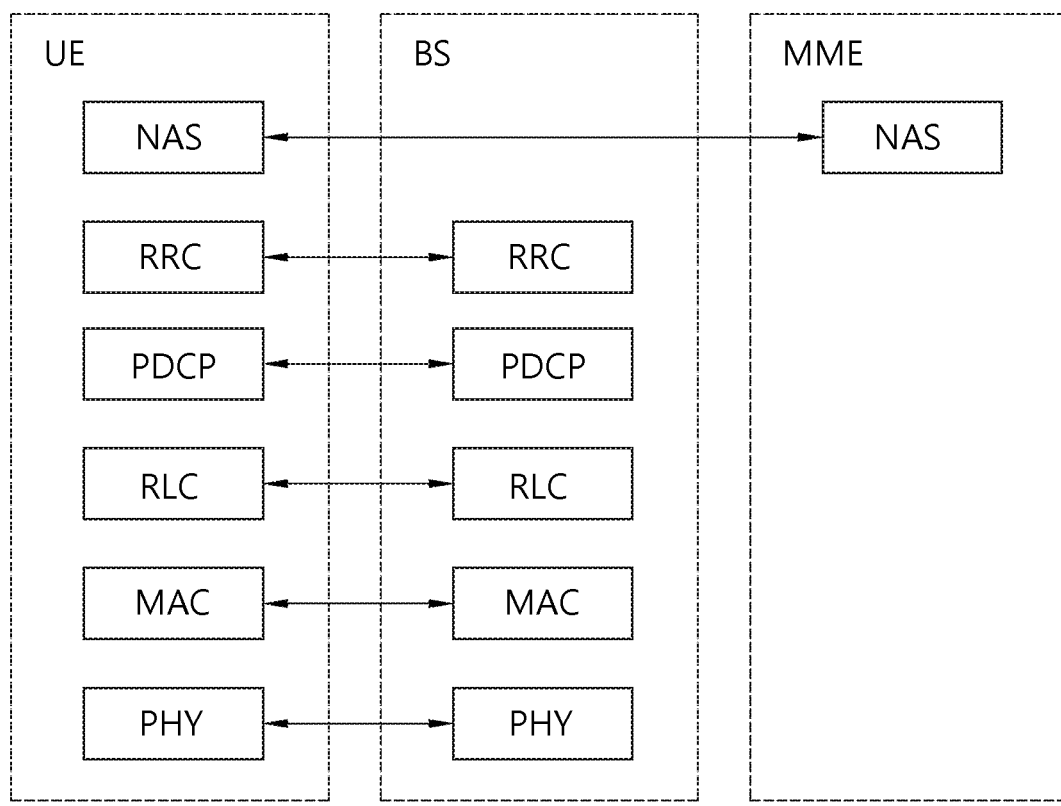
FIG. 2 shows a control plane of a radio interface protocol of an LTE system.
Figure 3:
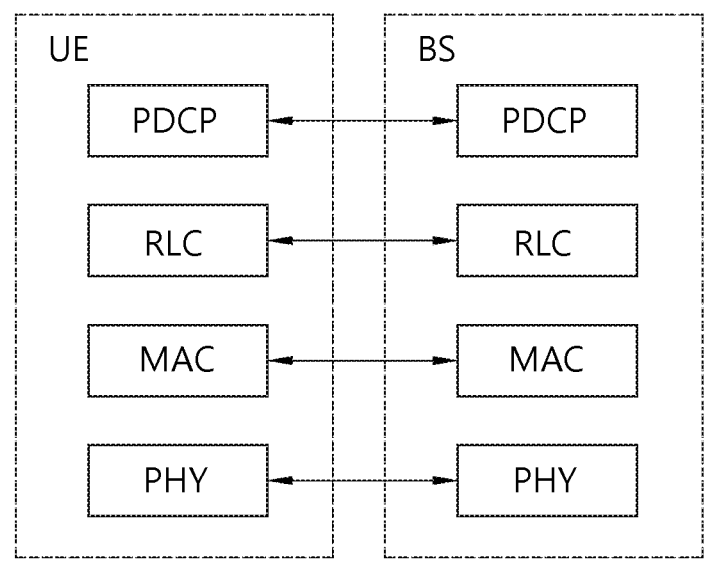
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

Referring to FIG. 2, the RLC and MAC layers (terminated in the eNB on the network side) may perform functions such as scheduling, automatic repeat request (ARQ), and hybrid automatic repeat request (HARD). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Figure 4:
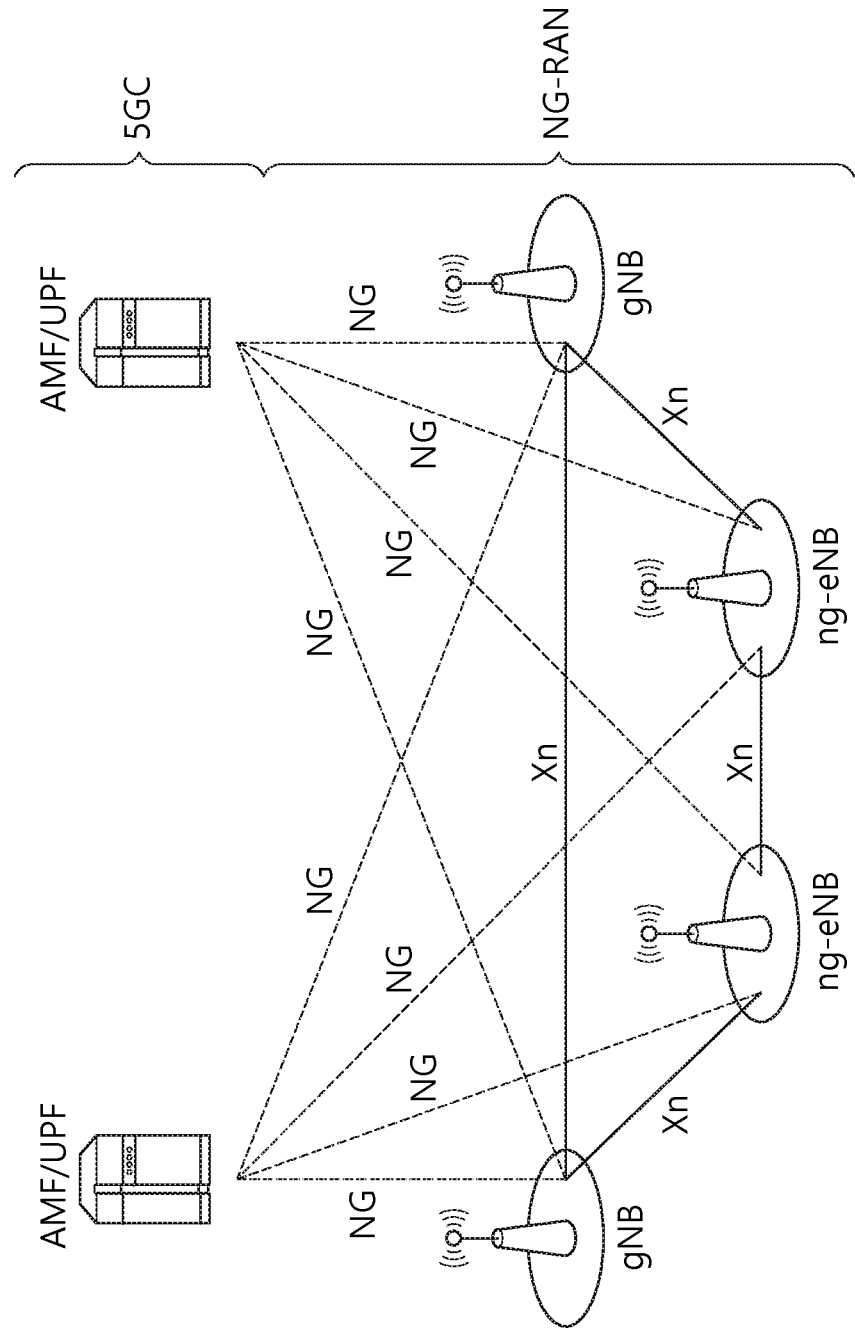
FIG. 4 shows 5G system architecture.

FIG. 4 shows 5G system architecture.

Referring to FIG. 4, a Next Generation Radio Access Network (NG-RAN) node may be either a gNB providing NR Radio Access (NR) user plane and control plane protocol terminations towards the UE or an ng-eNB providing Evolved Universal Terrestrial Radio Access (E-UTRA) user plane and control plane protocol terminations towards the UE. The gNBs and ng-eNBs may be interconnected with each other by means of the Xn interface. The gNBs and ng-eNBs may be also connected by means of the NG interfaces to the 5G Core Network (5GC), more specifically to the AMF (Access and Mobility Management Function) by means of the NG-C interface and to the UPF (User Plane Function) by means of the NG-U interface. The NG-C may be control plane interface between NG-RAN and SGC, and the NG-U may be user plane interface between NG-RAN and SGC.

Figure 5:
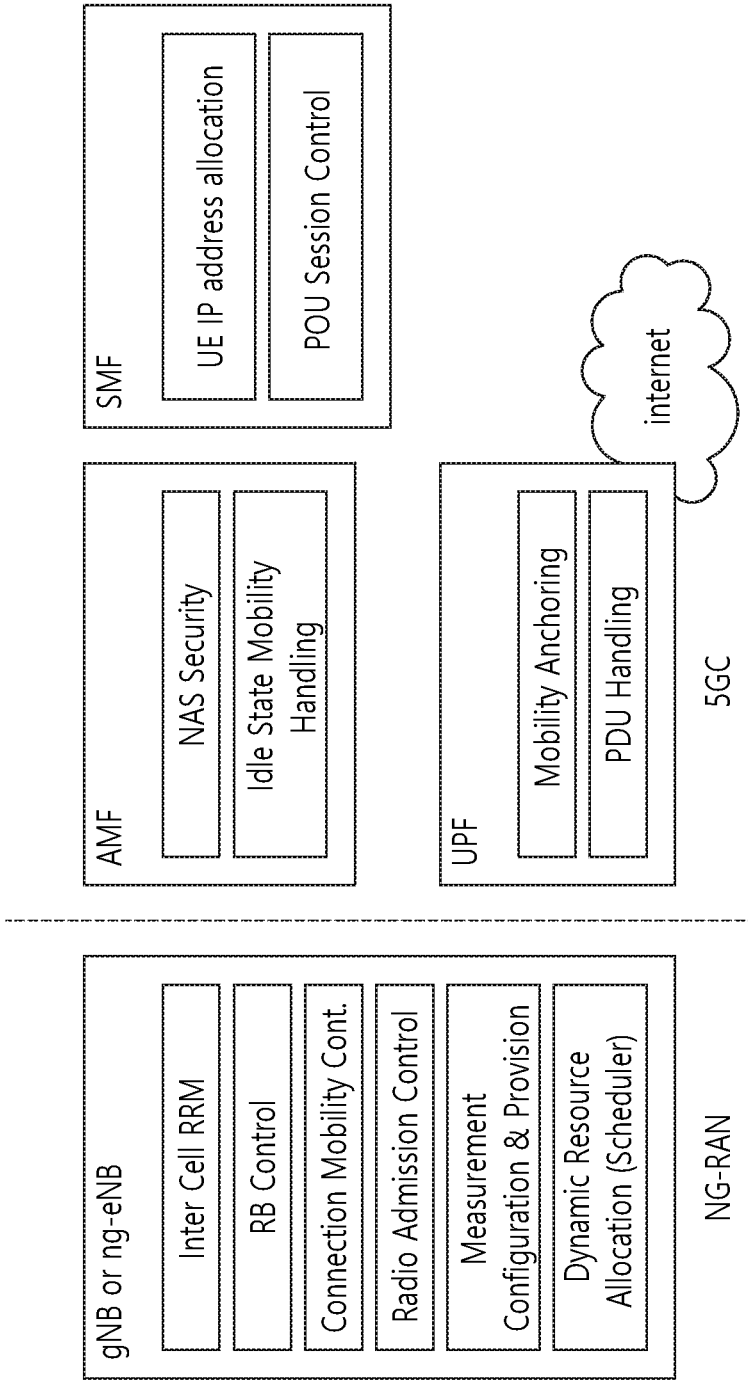
FIG. 5 shows functional split between NG-RAN and 5GC.

FIG. 5 shows functional split between NG-RAN and 5GC.

Referring to FIG. 5, the gNB and ng-eNB may host the following functions:

Functions for Radio Resource Management: Radio Bearer Control, Radio Admission Control, Connection Mobility Control, Dynamic allocation of resources to UEs in both uplink and downlink (scheduling);
IP header compression, encryption and integrity protection of data;
Selection of an AMF at UE attachment when no routing to an AMF can be determined from the information provided by the UE;
Routing of User Plane data towards UPF(s);
Routing of Control Plane information towards AMF;
Connection setup and release;
Scheduling and transmission of paging messages;
Scheduling and transmission of system broadcast information (originated from the AMF or O&M);
Measurement and measurement reporting configuration for mobility and scheduling;
Transport level packet marking in the uplink;
Session Management;
Support of Network Slicing;
QoS Flow management and mapping to data radio bearers;
Support of UEs in RRC_INACTIVE state;
Distribution function for NAS messages;
Radio access network sharing;
Dual Connectivity;
Tight interworking between NR and E-UTRA.

The Access and Mobility Management Function (AMF) may host the following main functions:
NAS signalling termination;
NAS signalling security;
AS Security control;
Inter CN node signalling for mobility between 3GPP access networks;
Idle mode UE Reachability (including control and execution of paging retransmission);
Registration Area management;
Support of intra-system and inter-system mobility;
Access Authentication;
Access Authorization including check of roaming rights;
Mobility management control (subscription and policies);
Support of Network Slicing;
SMF selection.

The User Plane Function (UPF) may host the following main functions:
Anchor point for Intra-/Inter-RAT mobility (when applicable);
External PDU session point of interconnect to Data Network;
Packet routing & forwarding;
Packet inspection and User plane part of Policy rule enforcement;
Traffic usage reporting;
Uplink classifier to support routing traffic flows to a data network;
Branching point to support multi-homed PDU session;
QoS handling for user plane, e.g. packet filtering, gating, UL/DL rate enforcement;
Uplink Traffic verification (SDF to QoS flow mapping);
Downlink packet buffering and downlink data notification triggering.

The Session Management function (SMF) may host the following main functions:
Session Management;
UE IP address allocation and management;
Selection and control of UP function;

Configures traffic steering at UPF to route traffic to proper destination;

Control part of policy enforcement and QoS;

Downlink Data Notification.

Hereinafter, a protocol data unit (PDU) is described.

A MAC PDU is a bit string that is byte aligned (i.e. multiple of 8 bits) in length. MAC SDUs are bit strings that are byte aligned (i.e. multiple of 8 bits) in length. A service data unit (SDU) is included into a MAC PDU from the first bit onward.

Figure 6:
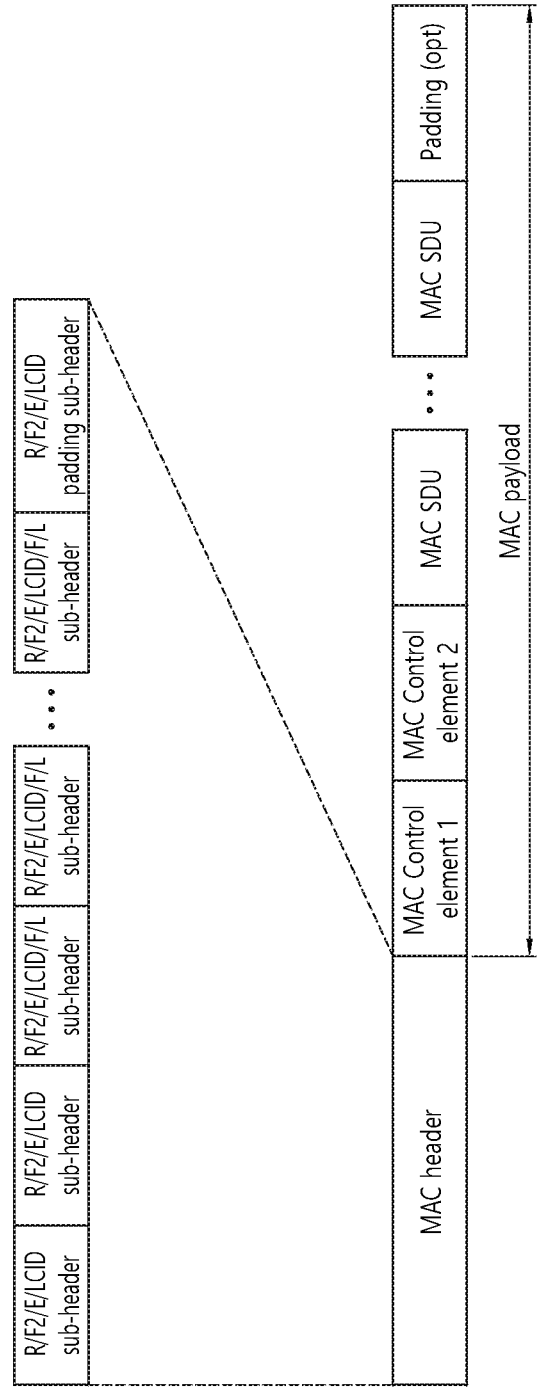
FIG. 6 shows an example of MAC PDU including MAC header, MAC control elements, MAC SDUs and padding.

FIG. 6 shows an example of MAC PDU including MAC header, MAC control elements, MAC SDUs and padding.

Referring to FIG. 6, a MAC PDU consists of a MAC header, zero or more MAC SDUs, zero or more MAC control elements, and optionally padding. Both the MAC header and the MAC SDUs are of variable sizes. Both the MAC header and the MAC SDUs are of variable sizes. A MAC PDU header consists of one or more MAC PDU subheaders. Each subheader corresponds to either a MAC SDU, a MAC control element or padding. A MAC PDU subheader consists of the five or six header fields R/F2/E/LCID/(F)/L but for the last subheader in the MAC PDU and for fixed sized MAC control elements. The last subheader in the MAC PDU and subheaders for fixed sized MAC control elements consist solely of the four header fields R/F2/E/LCID. A MAC PDU subheader corresponding to padding consists of the four header fields R/F2/E/LCID.

MAC PDU subheaders have the same order as the corresponding MAC SDUs, MAC control elements and padding. MAC control elements are always placed before any MAC SDU. Padding occurs at the end of the MAC PDU, except when single-byte or two-byte padding is required. Padding may have any value and the MAC entity shall ignore it. When padding is performed at the end of the MAC PDU, zero or more padding bytes are allowed. When single-byte or two-byte padding is required, one or two MAC PDU subheaders corresponding to padding are placed at the beginning of the MAC PDU before any other MAC PDU subheader. A maximum of one MAC PDU can be transmitted per transport block (TB) per MAC entity. A maximum of one MCH MAC PDU can be transmitted per transmission time interval (TTI).

Hereinafter, a Semi-Persistent Scheduling (SPS) is described.

When Semi-Persistent Scheduling is enabled by RRC, the following information is provided:

Semi-Persistent Scheduling C-RNTI or UL Semi-Persistent Scheduling V-RNTI (V2X RNTI);

Uplink Semi-Persistent Scheduling interval (semiPersistSchedIntervalUL) and number of empty transmissions before implicit release (implicitReleaseAfter), if Semi-Persistent Scheduling with Semi-Persistent Scheduling C-RNTI is enabled for the uplink;

Uplink Semi-Persistent Scheduling interval (semiPersistSchedIntervalUL) and number of empty transmissions before implicit release (implicitReleaseAfter) for each SPS configuration, if Semi-Persistent Scheduling with UL Semi-Persistent Scheduling V-RNTI is enabled for the uplink;

Whether twoIntervalsConfig is enabled or disabled for uplink, only for TDD;

Downlink Semi-Persistent Scheduling interval (semiPersistSchedIntervalDL) and number of configured HARQ processes for Semi-Persistent Scheduling (numberOfConfSPS-Processes), if Semi-Persistent Scheduling is enabled for the downlink;

The semiPersistSchedIntervalUL may be semi-persistent scheduling interval in uplink. Value in number of sub-frames. Value sf10 corresponds to 10 sub-frames, sf20 corresponds to 20 sub-frames and so on. For TDD, when the configured Semi-persistent scheduling interval is greater than or equal to 10 sub-frames, the UE shall round this parameter down to the nearest integer (of 10 sub-frames), e.g. sf10 corresponds to 10 sub-frames, sf32 corresponds to 30 sub-frames, sf128 corresponds to 120 sub-frames.

The implicitReleaseAfter may be number of empty transmissions before implicit release. Value e2 corresponds to 2 transmissions, e3 corresponds to 3 transmissions and so on. If skipUplinkTxSPS is configured, the UE shall ignore this field.

The twoIntervalsConfig may be trigger of two-intervals-Semi-Persistent Scheduling in uplink. If this field is present and the configured Semi-persistent scheduling interval greater than or equal to 10 sub-frames, two-intervals-SPS is enabled for uplink. Otherwise, two-intervals-SPS is disabled.

The semiPersistSchedIntervalDL may be semi-persistent scheduling interval in downlink. Value in number of sub-frames. Value sf10 corresponds to 10 sub-frames, sf20 corresponds to 20 sub-frames and so on. For TDD, the UE shall round this parameter down to the nearest integer (of 10 sub-frames), e.g. sf10 corresponds to 10 sub-frames, sf32 corresponds to 30 sub-frames, sf128 corresponds to 120 sub-frames.

The numberOfConfSPS-Processes may be the number of configured HARQ processes for downlink Semi-Persistent Scheduling.

When Semi-Persistent Scheduling for uplink or downlink is disabled by RRC, the corresponding configured grant or configured assignment shall be discarded. Semi-Persistent Scheduling is supported on the SpCell only. Semi-Persistent Scheduling is not supported for RN communication with the E-UTRAN in combination with an RN subframe configuration.

Meanwhile, according to the prior art, a resource pool is configured only on a single carrier. Thus, an RRC layer of the UE (i.e. UE RRC) selects a resource pool on a single carrier, and then a MAC layer of the UE (i.e. UE MAC) performs resource (re-)selection on the selected resource pool. On the other hand, in case that resource pools are configured on multiple carriers, the UE may perform parallel transmissions on different carriers. If the UE performs parallel transmissions on different carriers, the UE will independently select resources on each pool/carrier. In this case, the UE may perform parallel transmissions on congested carriers, and so increase congestion on those carriers. Hereinafter, a method for a UE to transmit a MAC PDU on multiple carriers and an apparatus supporting the same according to an embodiment of the present invention are described in detail.

According to an embodiment of the present invention, a base station may inform the UE about priority information. For example, the base station may be eNB or gNB. For instance, the priority information may include at least one of a priority of each SPS configuration, priorities of all SPS configurations, priorities of all activated SPS configurations, a priority of a carrier associated with at least one SPS configuration (i.e. a carrier where at least one SPS configuration is configured), priorities of all carriers associated with all SPS configurations (i.e. all carriers where at least one SPS configuration is configured), or priorities of all carriers associated with all activated SPS configurations (i.e. all carriers where at least one SPS configuration is/has been activated).

According to an embodiment of the present invention, the priority information may be transmitted/indicated to the UE via at least one of downlink control information (DCI) of a PDCCH, a downlink MAC control element (CE) or an RRC message. When a particular SPS configuration is activated or re-activated, the base station may transmit/indicate the priority information to the UE via the PDCCH (re-)activating the SPS configuration. When a particular SPS configuration is activated or re-activated or when at least one priority of a SPS configuration changes, the base station may transmit/indicate the priority information to the UE via a downlink MAC CE scheduled by the PDCCH (re-)activating the SPS configuration. When multiple SPS configurations are configured by an RRC message, the base station may transmit/indicate the priority of the SPS configuration or priorities of all activated SPS configurations to the UE via the RRC message. The PDCCH may be addressed to one of C-RNTI, Semi-Persistent Scheduling C-RNTI, UL Semi-Persistent Scheduling V-RNTI, or SL Semi-Persistent Scheduling V-RNTI.

The priority information may be included in at least one of the DCI of the PDCCH, the downlink MAC CE or the RRC message. The priority information may include a list of SPS indexes, a list of carriers, a list of cells, or a list of priorities.

One listed SPS index may be mapped to one SPS configuration. One listed carrier may be mapped to one carrier where at least one SPS configuration is configured. One listed carrier may be mapped to one carrier where at least one SPS configuration is activated. One listed cell may be mapped to one serving cell or one carrier where at least one SPS configuration is configured. One listed cell may be mapped to one serving cell or one carrier where at least one SPS configuration is activated. One listed priority may correspond to a priority of the SPS configuration mapped to the listed SPS index. One listed priority may correspond to a priority of the listed carrier. The carrier may be an uplink carrier. The carrier may be a sidelink carrier.

If all priorities of all activated SPS configurations are received, the UE may apply the priorities to logical channel prioritization (LCP). In the logical channel prioritization procedure, the UE may priority the carrier of the activated SPS configuration having the highest priority (e.g. with the lowest priority value or with the highest priority value) over the other carriers. Alternatively, the UE may priority the activated SPS configuration having the highest priority (e.g. with the lowest priority value or with the highest priority value) over the other SPS configurations.

Thus, for transmissions of multiple MAC PDUs on multiple carriers at the same time or within a time interval, the UE may occupy a data from the resources allocated on the carrier or the SPS configuration with the highest priority. The multiple MAC PDUs may be transmitted in an uplink transmission or a sidelink transmission. Then, if the resources allocated on the carrier or the SPS configuration with the highest priority is exhausted and if remaining data is still available for transmission, the UE may occupy the remaining data on the resources allocated on the carrier or the SPS configuration with the second highest priority.

Desirably, the priority may be a new priority value, a logical channel priority, a ProSe priority per packet (PPPP) value or a channel busy ratio (CBR) value of the carrier. The carrier is a carrier where at least one SPS configuration is configured.

Alternatively, the UE may measure CBR on the carrier where at least one SPS configuration is configured. If CBR value becomes available, the UE may use the measured CBR value of the carrier as the priority of the carrier. If CBR value becomes available, the UE may use the measured CBR value of the carrier as the priority of the SPS configuration configured on the carrier.

If multiple SPS configurations are activated, the UE may select resources (e.g. sidelink resources, sidelink grants, uplink grants, or resource grants) for each activated SPS configuration. Then, for transmission of each MAC PDU associated to a sidelink control information (SCI), the UE may select a SPS configuration among the activated SPS configurations in the logical channel prioritization. The selected SPS configuration may have the earliest sidelink grant in time, among the activated SPS configurations. The selected SPS configuration may have the highest priority, among the activated SPS configurations.

If multiple activated SPS configurations have resources (e.g. sidelink resources, sidelink grants, uplink grants, or resource grants) on different carriers at the same time, the UE may select a SPS configuration with the highest priority in the logical channel prioritization, or select a carrier of a SPS configuration with the highest priority in the logical channel prioritization. The UE may occupy data on the resource (e.g. sidelink resource, sidelink grant, uplink grant, or resource grant) of the selected SPS configuration. If the UE still has remaining data available for transmission, the UE may secondly select a SPS configuration with the second highest priority, or select a carrier of a SPS configuration with the second highest priority. Then, the UE may occupy the remaining data on the resource (e.g. sidelink resource, sidelink grant, uplink grant, or resource grant) of the secondly selected SPS configuration. The UE may perform transmissions of multiple MAC PDUs on the resources (e.g. sidelink resources, sidelink grants, uplink grants, or resource grants) of the selected SPS configurations.

If multiple activated SPS configurations have overlapped resources (e.g. sidelink resources, sidelink grants, uplink grants, or resource grants) on the same carrier at the same time, the UE may select a SPS configuration with the highest priority in the logical channel prioritization, or select a carrier of a SPS configuration with the highest priority in the logical channel prioritization. The UE may not perform transmission on the overlapped resource (e.g. sidelink resource, sidelink grant, uplink grant, or resource grant) of the non-selected SPS configuration. Thus, the UE may perform transmission of a MAC PDUs on the resource (e.g. sidelink resource, sidelink grant, uplink grant, or resource grant) of the selected SPS configuration.

Hereinafter, logical channel prioritization procedure is described according to an embodiment of the present invention. For convenience of explanation, the logical channel prioritization procedure for the sidelink will be described, but the present invention is not limited thereto. For instance, logical channel prioritization procedure may be applied for autonomous uplink transmission in unlicensed band, e.g., in LTE-U or LAA, according to an embodiment of the present invention.

Figure 7:
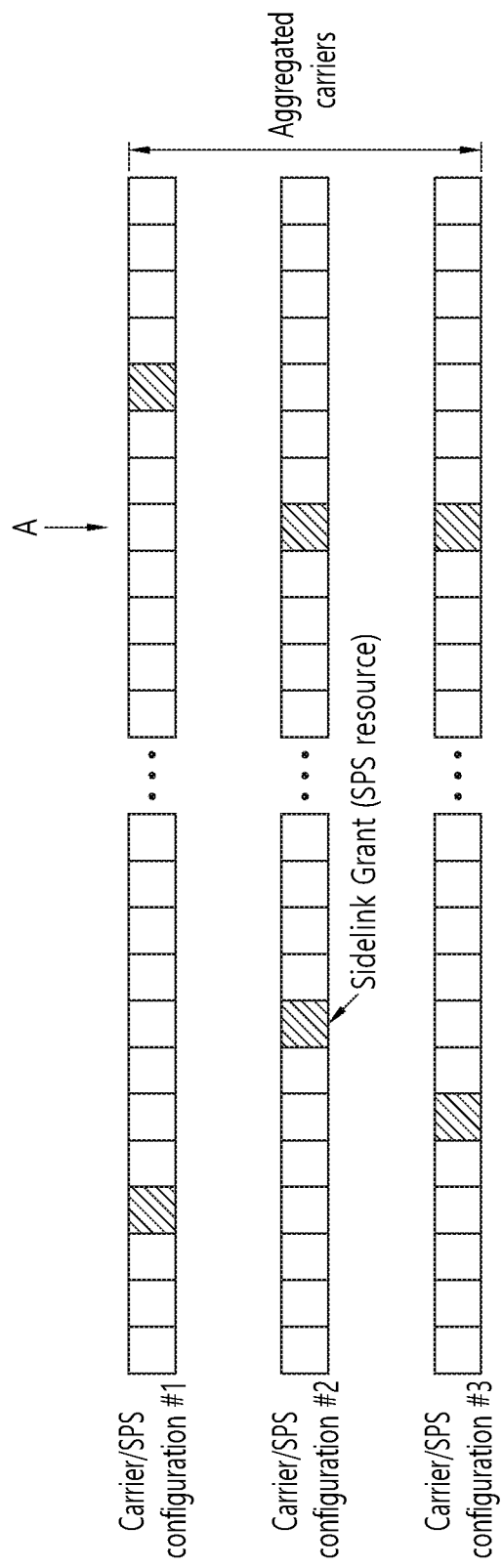
FIG. 7 shows a drawing to explain a procedure for selecting a carrier with the highest priority among multiple carriers according to an embodiment of the present invention.

FIG. 7 shows a drawing to explain a procedure for selecting a carrier with the highest priority among multiple carriers according to an embodiment of the present invention.

The UE may performs the logical channel prioritization procedure before transmitting a SCI and a MAC PDU on the resource grant (e.g. sidelink grant). The logical channel prioritization procedure may be applied when a new transmission is performed. Each logical channel (e.g. sidelink logical channel) may have an associated priority. The associated priority may be a ProSe priority per packet (PPPP). Multiple logical channels may have the same associated priority.

The UE may perform the following logical channel prioritization procedure. The logical channel prioritization procedure may be performed by a MAC entity of the UE. For example, the logical channel prioritization procedure may be for each SCI corresponding to a new transmission in V2X sidelink communication.

The MAC entity in the UE side may allocate resources to logical channels (e.g. sidelink logical channels) in the following steps:

Step 0: the UE may select a destination, having the sidelink logical channel with the highest priority, among the sidelink logical channels having data available for transmission. For example, the destination may be a ProSe destination.

Step 1: the UE may select a carrier of an activated SPS configuration or an activated SPS configuration with the earliest sidelink grant in time, among all carriers of all activated SPS configurations or all activated SPS configurations, except the previously selected carrier(s) or the previously selected activated SPS configuration(s) if any. The carrier of an activated SPS configuration having the earliest sidelink grant in time may be selected from among the all carriers of all activated SPS configurations. The activated SPS configuration having the earliest sidelink grant in time may be selected from among the all activated SPS configurations. Alternatively, the carrier of an activated SPS configuration having the highest priority may be selected from among the all carriers of all activated SPS configurations. The activated SPS configuration having the highest priority may be selected from among the all activated SPS configurations. The priority of the activated SPS configuration or the priority of the carrier of the activated SPS configuration may be configured or allocated by a network or a base station.

Referring to FIG. 7, the UE may be configured with three carriers or three SPS configurations. The three carriers or three SPS configurations may be configured by the RRC layer. Then, the base station may activate multiple SPS configurations, and allocate sidelink grants on those carriers of multiple SPS configurations as in FIG. 7. Thus, the UE may determine sidelink grants as in FIG. 7. That is, the UE may allocate sidelink grants as in FIG. 7. For instance, it is assumed that multiple sidelink grants over multiple carriers or multiple SPS configurations are available at the same time, at the point A in FIG. 7. If multiple sidelink grants over multiple carriers are available at the same time, the UE may select a carrier of an activated SPS configuration with the highest priority of the carrier. If multiple sidelink grants over multiple SPS configurations are available at the same time, the UE may selects an activated SPS configuration with the highest priority of the SPS configuration. The priority may be mapped to a CBR value. A low CBR value may have a higher priority than a high CBR value.

For each MAC PDU associated to the SCI for each carrier of an activated SPS configuration or each activated SPS configuration:

Step 2: Among the sidelink logical channels belonging to the selected destination and having data available for transmission, the UE may allocate resources to the sidelink logical channel with the highest priority;

Step 3: if any resources remain, sidelink logical channels belonging to the selected destination may be served in decreasing order of priority, until either the data for the sidelink logical channel(s) or the sidelink grant is exhausted, whichever comes first. Sidelink logical channels configured with equal priority may be served equally.

Step 4: if the data for the sidelink logical channel(s) is not exhausted, and if the sidelink grant on the selected carrier/pool is exhausted, UE proceeds to Step 0. Namely, in this case, the UE may repeat from Step 0 to Step 3. In this repetition, the UE may exclude the carrier(s) or the SPS configuration(s) which was previously selected in Step 1.

The UE may also follow the rules below during the scheduling procedures above:

The UE may not segment an RLC SDU (or partially transmitted SDU) if the whole SDU (or partially transmitted SDU) fits into the remaining resources;

If the UE segments an RLC SDU from the sidelink logical channel, it shall maximize the size of the segment to fill the grant as much as possible;

The UE may maximize the transmission of data;

If the MAC entity is given a sidelink grant size that is equal to or larger than 10 bytes (for sidelink communication) or 11 bytes (for V2X sidelink communication) while having data available for transmission, the MAC entity may not transmit only padding.

When the MAC entity is requested to transmit multiple MAC PDUs in one TTI, the above step 1, 2 & 3 and the associated rules may be applied to sidelink grant on each carrier/pool, independently. Alternatively, when the MAC entity is requested to transmit multiple MAC PDUs in one TTI, the above step 1, 2 & 3 and the associated rules may be applied to the sum of the capacities of sidelink grants of all selected carriers/pools.

Figure 8:
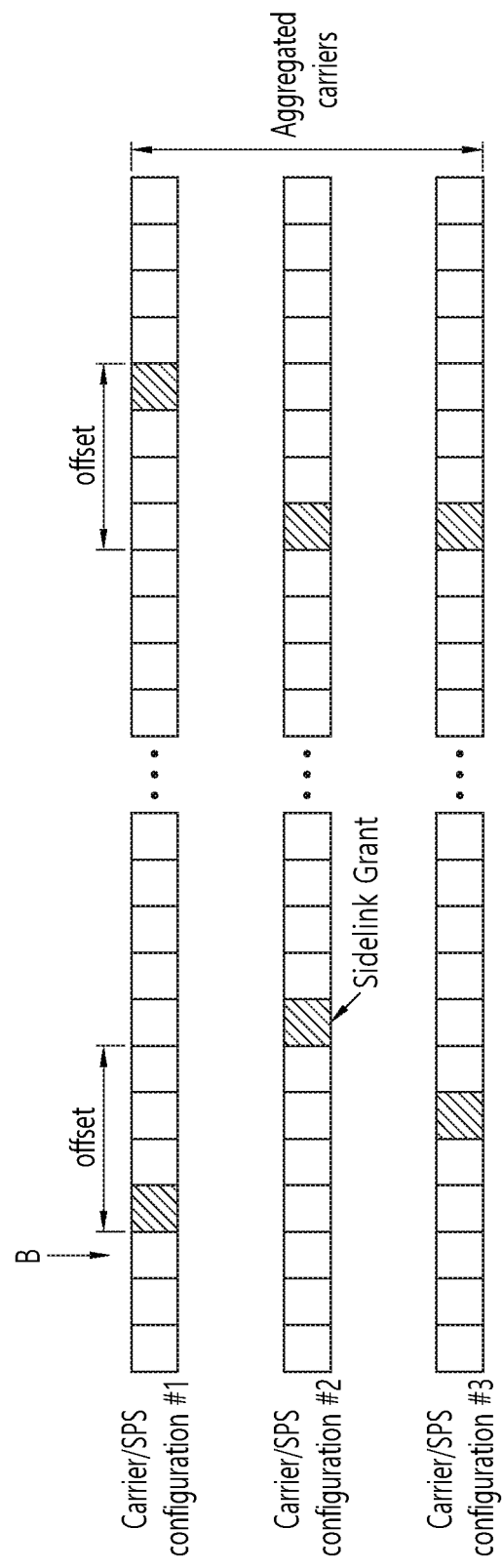
FIG. 8 shows a drawing to explain a procedure for selecting a carrier with resource grant within an offset among multiple carriers according to an embodiment of the present invention.

FIG. 8 shows a drawing to explain a procedure for selecting a carrier with resource grant within an offset among multiple carriers according to an embodiment of the present invention.

Referring to FIG. 8, the UE may be configured with three carriers of multiple SPS configurations. The three carriers of multiple SPS configurations may be configured by the RRC layer. Then, the base station may activate multiple SPS configurations, and allocate sidelink grants on those carriers of multiple SPS configurations as in FIG. 8. Thus, the UE may determine and allocate sidelink grants as in FIG. 8.

For example, it is assumed that a data becomes available for transmission at the point B in FIG. 8. Hereinafter, logical channel prioritization procedure in case that the data becomes available for transmission at the point B is described, according to an embodiment of the present invention.

Firstly, if the data becomes available for transmission at the point B, the UE may select a destination, having the sidelink logical channel with the highest priority, among the sidelink logical channels having data available for transmission. Then, the UE may select a carrier and/or SPS configuration within a time offset, among the carriers and/or SPS configurations configured by the RRC layer. The time offset may start from the earliest sidelink grant in time.

In FIG. 8, the UE may select carrier #1 and/or SPS configuration #1 which provide sidelink grants within the time offset from the earliest sidelink grant in time. In this case, the UE may select a carrier and/or SPS configuration which provides the lowest CBR level. Or, the UE may select a carrier and/or SPS configuration which provides the highest priority. The CBR level or priority may be indicated by the network. Alternatively, the CBR level or priority may be determined by the UE. Namely, the UE may determine a CBR level, priorities of carriers, or priorities of SPS configurations based on a measurement result.

If the carrier #1 and/or the SPS configuration #1 provides a lower CBR value than the carrier #3 and/or the SPS configuration #3, the UE may select the carrier #1 and/or the SPS configuration #1. Then, the UE may perform the Step 2 and the Step 3 on the selected the carrier #1 and/or the SPS configuration #1.

Alternatively, if the carrier #1 and/or the SPS configuration #1 a higher priority than the carrier #3 and/or the SPS configuration #3, the UE may select the carrier #1 and/or the SPS configuration #1. Then, the UE may perform the Step 2 and the Step 3 on the selected the carrier #1 and/or the SPS configuration #1.

Desirably, if the CBR value or the priority information is not available, the UE may randomly select a carrier and/or a SPS configuration among multiple carriers and/or SPS configurations (i.e. carrier and/or the SPS configuration #1 and #3) providing sidelink grants within the time offset. In this example, if the CBR value or the priority information is not available for carrier #1 and/or carrier #3, UE randomly choose one of them. It is assume that the UE selects the carrier #1 and/or the SPS configuration #1.

Secondly, if the data for the sidelink logical channel(s) is still not exhausted, but if the sidelink grant on the carrier #1 and/or the SPS configuration #1 is exhausted, the UE may select the carrier #3 and/or the SPS configuration #3. Then, the UE may perform the Step 2 and the Step 3 on the selected carrier #3 and/or SPS configuration #3. Finally, the UE may transmit a MAC PDU on each selected carrier and/or SPS configuration. Note that the sidelink grant on the carrier #2 and/or SPS configuration #2 is not used in this example because the sidelink grant on the carrier #2 and/or SPS configuration #2 is not within the time offset.

Figure 9:
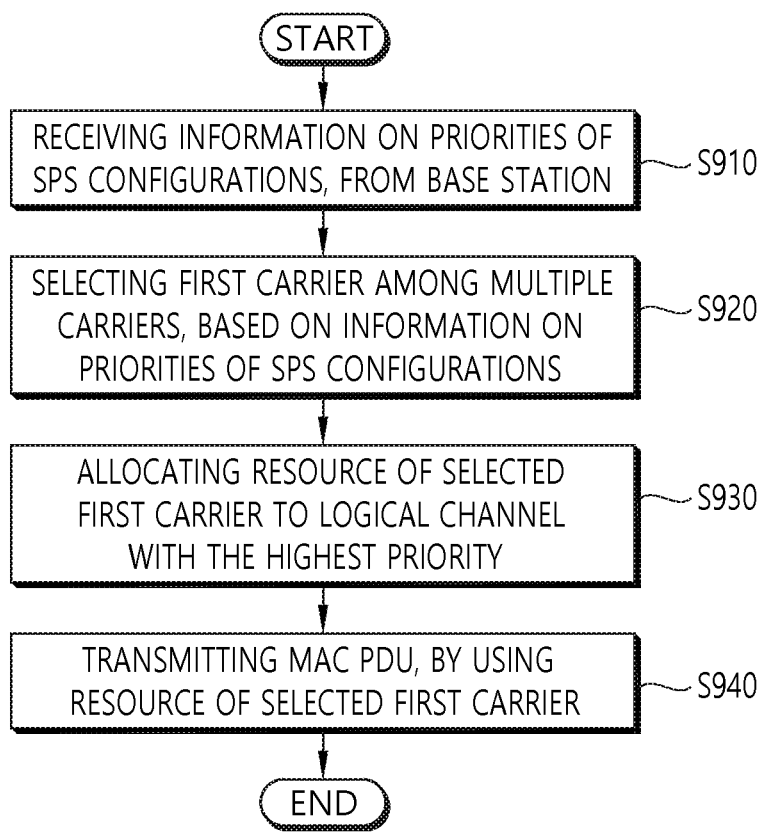
FIG. 9 is a block diagram illustrating a method for a UE to transmit a MAC PDU according to an embodiment of the present invention.

FIG. 9 is a block diagram illustrating a method for a UE to transmit a MAC PDU according to an embodiment of the present invention.

Referring to FIG. 9, in step S910, the UE may receive information on priorities of semi persistent scheduling (SPS) configurations, from a base station. The information on priorities of SPS configurations may include a priority of each of SPS configurations. The information on priorities of SPS configurations may include priorities of activated SPS configurations.

Furthermore, the UE may allocate resource grants on the multiple carriers. The resource grants may be allocated on the multiple carriers, by the UE, autonomously. Alternatively, the base station may allocate resource grants on the multiple carriers. The resource grants may be allocated on the multiple carriers, by the UE, based on a configuration received from the base station.

In step S920, the UE may select a first carrier among the multiple carriers, based on the information on priorities of the SPS configurations. The first carrier may be a carrier which has a SPS configuration with the highest priority among the multiple carriers. The first carrier may be a carrier which has an activated SPS configuration with the highest priority among the multiple carriers. The first carrier may correspond to the SPS configuration with the highest priority. The first carrier may correspond to the activated SPS configuration with the highest priority.

The first carrier may be a carrier which has a resource grant within a time offset among the multiple carriers. If there are a plurality of carriers having the resource grant within the time offset, the first carrier may be a carrier which has a SPS configuration with the highest priority among the plurality of carriers. The time offset may start from a time of the earliest resource grant among the multiple carriers.

In step S930, the UE may allocate a resource of the selected first carrier to a logical channel with the highest priority.

Furthermore, the UE may construct the MAC PDU, based on a data of the logical channel with the highest priority.

In step S940, the UE may transmit the MAC PDU, by using the resource of the selected first carrier.

Furthermore, the UE may select a second carrier among the multiple carriers, based on the information on priorities of the SPS configurations, if a data for the logical channel remains and a resource grant on the selected first carrier is exhausted. The second carrier may be a carrier which has a resource grant within a time offset among the multiple carriers. The second carrier may be a carrier which has a SPS configuration with the second highest priority among the multiple carriers. The second carrier may be a carrier which has an activated SPS configuration with the second highest priority among the multiple carriers. The second carrier may correspond to the SPS configuration with the second highest priority. The second carrier may correspond to the activated SPS configuration with the second highest priority.

Furthermore, the UE may select a destination, having the logical channel with the highest priority, among logical channels having data available for transmission. The resource of the selected first carrier may be allocated to the logical channel with the highest priority, among the logical channels belonging to the selected destination and having data available for transmission.

According to an embodiment of the present invention, in case that resource pools are configured on multiple carriers, the UE selects certain carrier corresponding to certain SPS configuration, based on the information on priorities of the SPS configurations. Thus, in case that the UE perform parallel sidelink/uplink transmissions, congested carriers is not used for sidelink/uplink transmissions.

Figure 10:
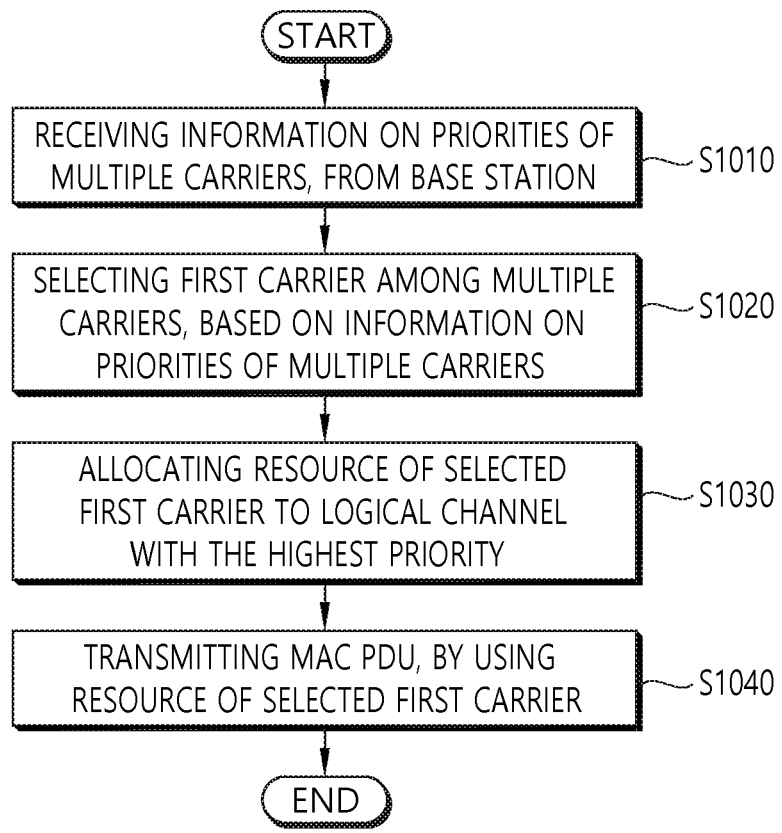
FIG. 10 is a block diagram illustrating a method for a UE to transmit a MAC PDU according to an embodiment of the present invention.

FIG. 10 is a block diagram illustrating a method for a UE to transmit a MAC PDU according to an embodiment of the present invention.

Referring to FIG. 10, in step S1010, the UE may receive information on priorities of multiple carriers, from a base station. The information on priorities of multiple carriers may include a priority of a carrier associated with at least one SPS configuration. The information on priorities of multiple carriers may include priorities of carriers associated with activated SPS configurations.

Furthermore, the UE may allocate resource grants on the multiple carriers. The resource grants may be allocated on the multiple carriers, by the UE, autonomously. Alternatively, the base station may allocate resource grants on the multiple carriers. The resource grants may be allocated on the multiple carriers, by the UE, based on a configuration received from the base station.

In step S1020, the UE may select a first carrier among the multiple carriers, based on the information on priorities of the multiple carriers. The first carrier may be a carrier which has the highest priority among the multiple carriers.

The first carrier may be a carrier which has a resource grant within a time offset among the multiple carriers. If there are a plurality of carriers having the resource grant within the time offset, the first carrier may be a carrier which has the highest priority among the plurality of carriers. The time offset may start from a time of the earliest resource grant among the multiple carriers.

In step S1030, the UE may allocate a resource of the selected first carrier to a logical channel with the highest priority.

Furthermore, the UE may construct the MAC PDU, based on a data of the logical channel with the highest priority.

In step S1040, the UE may transmit the MAC PDU, by using the resource of the selected first carrier.

Furthermore, the UE may select a second carrier among the multiple carriers, based on the information on priorities of the multiple carriers, if a data for the logical channel remains and a resource grant on the selected first carrier is exhausted. The second carrier may be a carrier which has a resource grant within a time offset among the multiple carriers. The second carrier may be a carrier which has the second highest priority among the multiple carriers.

Furthermore, the UE may select a destination, having the logical channel with the highest priority, among logical channels having data available for transmission. The resource of the selected first carrier may be allocated to the logical channel with the highest priority, among the logical channels belonging to the selected destination and having data available for transmission.

According to an embodiment of the present invention, in case that resource pools are configured on multiple carriers, the UE selects certain carrier, based on the information on priorities of the multiple carriers. Thus, in case that the UE perform parallel sidelink/uplink transmissions, congested carriers is not used for sidelink/uplink transmissions.

Figure 11:
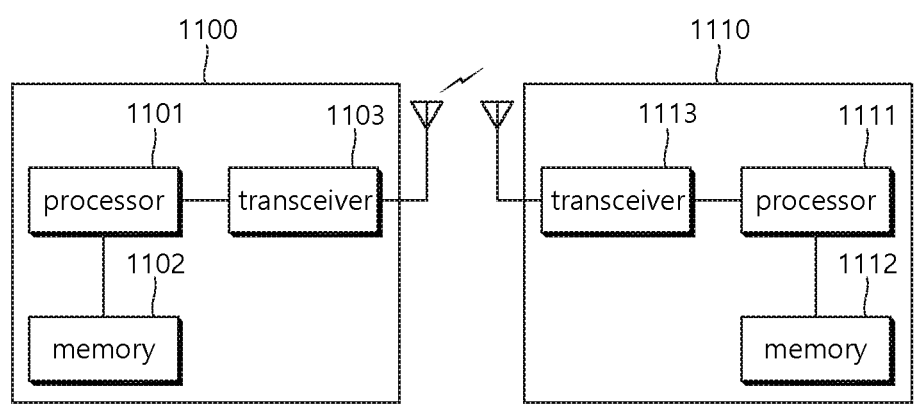
FIG. 11 is a block diagram illustrating a wireless communication system according to the embodiment of the present invention.

FIG. 11 is a block diagram illustrating a wireless communication system according to the embodiment of the present invention.

A BS 1100 includes a processor 1101, a memory 1102 and a transceiver 1103. The memory 1102 is connected to the processor 1101, and stores various information for driving the processor 1101. The transceiver 1103 is connected to the processor 1101, and transmits and/or receives radio signals. The processor 1101 implements proposed functions, processes and/or methods. In the above embodiment, an operation of the base station may be implemented by the processor 1101.

A UE 1110 includes a processor 1111, a memory 1112 and a transceiver 1113. The memory 1112 is connected to the processor 1111, and stores various information for driving the processor 1111. The transceiver 1113 is connected to the processor 1111, and transmits and/or receives radio signals. The processor 1111 implements proposed functions, processes and/or methods. In the above embodiment, an operation of the base station may be implemented by the processor 1111.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method for transmitting, by a user equipment (UE), a medium access control protocol data unit (MAC PDU) in a wireless communication system, the method comprising:
   receiving information regarding first semi persistent scheduling (SPS) configuration and information regarding second SPS configuration, from a base station, wherein a first resource of the first SPS configuration and a second resource of the second SPS configuration are overlapped in a first time;
   activating the first SPS configuration and the second SPS configuration;
   allocating the first resource of the first SPS configuration to a first logical channel with a first priority in logical channel prioritization;
   allocating the second resource of the second SPS configuration to a second logical channel with a second priority in the logical channel prioritization;
   based on (i) the first resource and the second resource that are overlapped in the first time and (ii) the first priority that is higher than the second priority, selecting the first SPS configuration in the first time; and
   transmitting a MAC PDU related to the first logical channel in the first time, based on the first resource of the first SPS configuration,
   wherein transmission is not performed based on the second resource of the second SPS configuration not selected in the first time.

2. The method of claim 1, wherein a third resource of the first SPS configuration and a fourth resource of the second SPS configuration are overlapped in a second time.

3. The method of claim 2, further comprising:
   allocating the third resource of the first SPS configuration to a third logical channel with a third priority in the logical channel prioritization; and
   allocating the fourth resource of the second SPS configuration to a fourth logical channel with a fourth priority in the logical channel prioritization.

4. The method of claim 3, further comprising:
   based on (i) the third resource and the fourth resource that are overlapped in the second time and (ii) the fourth priority that is higher than the third priority, selecting the second SPS configuration in the second time.

5. The method of claim 4, further comprising:
   transmitting a MAC PDU related to the fourth logical channel in the second time, based on the fourth resource of the second SPS configuration, wherein transmission is not performed based on the third resource of the first SPS configuration not selected in the second time.

6. The method of claim 1, wherein the UE communicates with at least one of a mobile terminal, a network or autonomous vehicles other than the UE.

7. A user equipment (UE) configured to transmit a medium access control protocol data unit (MAC PDU) in a wireless communication network, the UE comprising:
   a memory storing instructions;
   a transceiver; and
   a processor, connected to the memory and the transceiver, configured to control the UE to perform operations based on execution of the instructions in the memory, the operations comprising:
   receiving, via the transceiver, information regarding first semi persistent scheduling (SPS) configuration and information regarding second SPS configuration, from a base station, wherein a first resource of the first SPS configuration and a second resource of the second SPS configuration are overlapped in a first time;
   activating the first SPS configuration and the second SPS configuration;
   allocating the first resource of the first SPS configuration to a first logical channel with a first priority in logical channel prioritization;
   allocating the second resource of the second SPS configuration to a second logical channel with a second priority in the logical channel prioritization;
   based on (i) the first resource and the second resource that are overlapped in the first time and (ii) the first priority that is higher than the second priority, selecting the first SPS configuration in the first time; and
   transmitting, via the transceiver, a MAC PDU related to the first logical channel in the first time, based on the first resource of the first SPS configuration,
   wherein transmission is not performed based on the second resource of the second SPS configuration not selected in the first time.

8. The UE of claim 7, wherein a third resource of the first SPS configuration and a fourth resource of the second SPS configuration are overlapped in a second time.

9. The UE of claim 8, wherein the operations further comprise:
   allocating the third resource of the first SPS configuration to a third logical channel with a third priority in the logical channel prioritization; and
   allocating the fourth resource of the second SPS configuration to a fourth logical channel with a fourth priority in the logical channel prioritization.

10. The UE of claim 9, wherein the operations further comprise:
    based on (i) the third resource and the fourth resource that are overlapped in the second time and (ii) the fourth priority that is higher than the third priority, selecting the second SPS configuration in the second time.

11. The UE of claim 10, wherein the operations further comprise:
    transmitting, via the transceiver, a MAC PDU related to the fourth logical channel in the second time, based on the fourth resource of the second SPS configuration,
    wherein transmission is not performed based on the third resource of the first SPS configuration not selected in the second time.

* * * * *